United States Patent
Marino et al.

(10) Patent No.: US 11,095,875 B2
(45) Date of Patent: Aug. 17, 2021

(54) AUTOMATIC TESTING OF HOME ENTERTAINMENT AUTOMATION SYSTEMS FOR CONTROLLING CONNECTED DEVICES

(71) Applicant: Caavo Inc, Milpitas, CA (US)

(72) Inventors: Nino V. Marino, Alameda, CA (US); Sharath H. Satheesh, Bangalore (IN); Ashish D. Aggarwal, Stevenson Ranch, CA (US); Shivam Khandelwal, Jaipur (IN); Neha Mittal, New Delhi (IN)

(73) Assignee: Caavo Inc, Milpitas, CA (US)

( * ) Notice: Subject to any disclaimer, the term of this patent is extended or adjusted under 35 U.S.C. 154(b) by 43 days.

(21) Appl. No.: 16/548,343

(22) Filed: Aug. 22, 2019

(65) Prior Publication Data

US 2019/0379887 A1    Dec. 12, 2019

Related U.S. Application Data

(63) Continuation-in-part of application No. 16/219,342, filed on Dec. 13, 2018.

(30) Foreign Application Priority Data

Dec. 16, 2017  (IN) .............................. 201741045277
Aug. 23, 2018  (IN) .............................. 201841031558

(51) Int. Cl.
| | |
|---|---|
| H04N 17/04 | (2006.01) |
| G06F 11/263 | (2006.01) |
| H04W 24/06 | (2009.01) |
| H04L 12/28 | (2006.01) |

(52) U.S. Cl.
CPC ........... *H04N 17/04* (2013.01); *G06F 11/263* (2013.01); *H04L 12/2805* (2013.01); *H04W 24/06* (2013.01)

(58) Field of Classification Search
CPC ...... H04N 17/04; G06F 11/263; H04W 24/06; H04L 12/2805
See application file for complete search history.

(56) References Cited

U.S. PATENT DOCUMENTS

| | | |
|---|---|---|
| 9,749,552 B2 | 8/2017 | Gopinath et al. |
| 10,506,180 B2 | 12/2019 | Gopinath et al. |
| 10,565,153 B2 | 2/2020 | Kashyap et al. |
| 2006/0080707 A1* | 4/2006 | Laksono ............... H04N 7/163 725/38 |
| 2012/0249890 A1* | 10/2012 | Chardon .......... H04N 21/43615 348/734 |
| 2014/0022462 A1 | 1/2014 | Arling et al. |

(Continued)

*Primary Examiner* — Jung H Park
(74) *Attorney, Agent, or Firm* — Fiala & Weaver P.L.L.C.

(57) ABSTRACT

Methods, systems, and apparatuses are described for testing communication with a device. A multimedia receiver may be communicatively coupled to a media device, such as a source media device. The multimedia receiver may transmit a test command to control the source media device using a communication protocol. A video frame output by the source media device may be obtained. Based at least on the video frame, it may be determined whether the source media device received the test command. In response to a determination that the source media device received the test command, an indication may be stored that the source media device may be controlled using the communication protocol.

20 Claims, 6 Drawing Sheets

(56) References Cited

U.S. PATENT DOCUMENTS

| | | |
|---|---|---|
| 2014/0222862 A1* | 8/2014 | Arling ................ H04N 21/4222 |
| | | 707/769 |
| 2015/0033275 A1 | 1/2015 | Natani et al. |
| 2017/0048577 A1 | 2/2017 | Chiou et al. |
| 2017/0331870 A1 | 11/2017 | Giger |
| 2018/0040237 A1* | 2/2018 | Arling .................... G08C 17/02 |
| 2018/0146233 A1 | 5/2018 | Satheesh et al. |
| 2018/0357445 A1 | 12/2018 | Kowalik et al. |
| 2019/0043345 A1 | 2/2019 | Owrang et al. |
| 2019/0191017 A1 | 6/2019 | Aggarwal et al. |
| 2020/0204864 A1 | 6/2020 | Aggarwal et al. |

* cited by examiner

AUTOMATIC TESTING OF HOME ENTERTAINMENT AUTOMATION SYSTEMS FOR CONTROLLING CONNECTED DEVICES

CROSS-REFERENCE TO RELATED APPLICATIONS

This application is a continuation-in-part of U.S. patent application Ser. No. 16/219,342, filed on Dec. 13, 2018, which claims foreign priority to Indian Patent Application No. 201741045277, filed on Dec. 16, 2017, the entireties of which are incorporated by reference herein. This application also claims foreign priority to Indian Patent Application No. 201841031558, filed on Aug. 23, 2018, the entirety of which is incorporated by reference herein.

BACKGROUND

Technical Field

The subject matter described herein relates to automatic testing of home entertainment automation systems for controlling connected devices using one or more communication protocols.

Description of Related Art

An entertainment system may comprise several audio/video (AV) devices connected to a television (TV) or high definition TV (HDTV). These devices may include, for example, a cable/satellite TV set top box (STB), an audio system, a Blu-ray® or DVD (digital versatile disc) player, a digital media adapter, a game console, a multimedia streaming device, etc. Each of these types of devices are typically controlled by a remote control, such as an infrared (IR) and a radio-frequency (RF) remote control. However, the selection of which of remote-control device to use is generally determined manually by a user (e.g., by selecting a particular remote control or device to communicate with the media device). Given the ever-growing number of devices in a living room, the number of remote-control devices that a user needs to operate can be expected to grow proportionately to the number of devices the user has in a given home entertainment setup.

In order to simplify the control of all these devices, a Home Automation Control System is typically used (e.g., Control4®, Logitech Harmony®, etc.), which provides the user a single point control device, such as a hand held remote, a tablet or a computer. While such a system may ease the use of a home entertainment system, setting up this type of system is often a time consuming and complex process. In some instances, a professional installer or home entertainment system expert may be needed. Even with the burdensome setup process, the difficulty of ensuring that the control system can control each device successfully still remains.

BRIEF SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and apparatuses are described for testing communication with a device. A multimedia receiver may be communicatively coupled to a media device, such as a source media device. The multimedia receiver may transmit a test command to control the source media device using a communication protocol. A video frame output by the source media device may be obtained. Based at least on the video frame, it may be determined whether the source media device received the test command. In response to a determination that the source media device received the test command, an indication may be stored that the source media device may be controlled using the communication protocol.

In a further implementation, methods, systems, and apparatuses are provided for determining the identity of a particular device available on a network that is coupled to a multimedia switch. One or more source media devices available on a network are identified. For each of the source media devices, a corresponding test command may be transmitted over the network to control the device. A video frame output by one of the source media devices is obtained, and based on the video frame, it is determined that the source media device from which the video frame was obtained received the corresponding test command. In response, the device identifier and an indication that the source media device can be controlled using one or more of communication protocols (e.g., Internet Protocol (IP), RF, IR, High-Definition Multimedia Interface Consumer Electronics Control (HDMI-CEC), etc.) may be stored.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Embodiments will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

Figure 1:
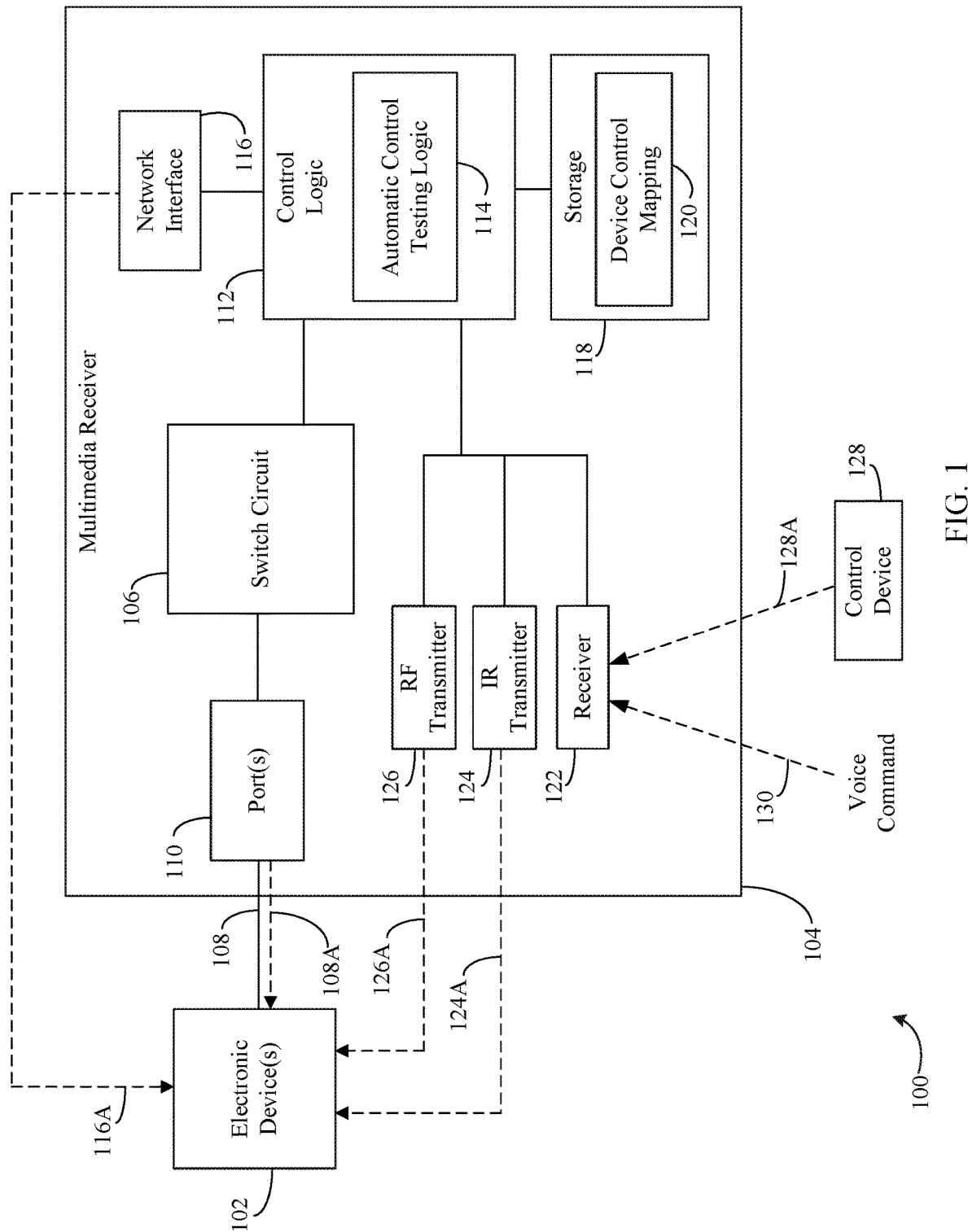
FIG. 1 depicts a block diagram of an exemplary multimedia receiver in accordance with embodiments described herein.

The present specification discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," "front," "rear," etc.) used herein are for purposes of illustration only, and that practical implementations of the structures described herein can be spatially arranged in any orientation or manner.

Numerous exemplary embodiments are described as follows. It is noted that the section/subsection headings used herein are not intended to be limiting. Embodiments described in this document may be eligible for inclusion within multiple different sections or subsections. Furthermore, disclosed embodiments may be combined with each other in any manner.

II. Example Embodiments

An entertainment system may comprise several audio/video (AV) devices connected to a television (TV) or high definition TV (HDTV). These devices may include, for example, a cable/satellite TV set top box (STB), an audio system, a Blu-ray® or DVD (digital versatile disc) player, a digital media adapter, a game console, a multimedia streaming device, etc. Each of these types of devices are typically controlled by a remote control, such as an infrared (IR) and a radio-frequency (RF) remote control. However, the selection of which of remote-control device to use is generally determined manually by a user (e.g., by selecting a particular remote control or device to communicate with the media device). Given the ever-growing number of devices in a living room, the number of remote-control devices that a user needs to operate can be expected to grow proportionately to the number of devices the user has in a given home entertainment setup.

In order to simplify the control of all these devices, a Home Automation Control System is typically used (e.g., Control4®, Logitech Harmony®, etc.), which provides the user a single point control device, such as a hand held remote, a tablet or a computer. While such a system may ease the use of a home entertainment system, setting up this type of system is often a time consuming and complex process. In some instances, a professional installer or home entertainment system expert may be needed. Even with the burdensome setup process, the difficulty of ensuring that the control system can control each device successfully still remains.

Techniques are described herein to automatically determine whether a device, such as a source media device, connected to a multimedia receiver may be controlled using one or more communication protocols. For instance, the multimedia receiver may comprise a home entertainment control system, such as a hub, a multimedia switching device, an audio/video receiver (AVR), etc. The control system may have a plurality of devices connected to it, such as a source media device (e.g., a media streaming device, a set-top box (STB), etc.) and a sink media device (e.g., a television (TV), projector, etc.). In implementations, audio/video (AV) content provided by a source media device may be received by the multimedia receiver, and transmitted for playback on a sink device, such as a TV or a projector. In some further examples, functionality described herein may also be implemented in the sink device itself.

In accordance with embodiments, a test command may be transmitted from a multimedia receiver to a source media device using one or more communication protocols (e.g., using IR, RF, High-Definition Multimedia Interface Consumer Electronics Control (HDMI-CEC), and/or Internet Protocol (IP)). The test command may include any type of control operation, such as a navigation command, selecting a particular icon or item of content, launching an application, launching a guide, launching a menu or other predetermined graphical user interface (GUI) screen, etc. Since the multimedia receiver receives the AV signals from source media device to which it is connected, the multimedia receiver may analyze one or more video frames (e.g., images representing the current output of the source media device) to determine whether the test command was received by the media device and successfully applied. In implementations, if the multimedia receiver verifies that the media device received the test command, the media device can be categorized as a device controllable using the communication protocol (e.g., by storing an indication in a storage).

In some implementations, the multimedia receiver may browse a network to identify one or more source media devices available on the network (such as a local area network). The multimedia receiver may transmit a command, such as a unique command, using a network-based communication protocol to each of the detected media devices and determine, based on a video frame received from one of the source media devices, which of the source media devices is coupled to the multimedia receiver. Based on such a determination, the source media device connected to control system may be identified (e.g., based on its network address) and categorized as controllable using the network-based communication protocol.

Thus, in accordance with implementations described herein, a multimedia receiver may automatically identify and test whether source media devices coupled to the multimedia receiver may be controlled using various communication protocols. Furthermore, the user need not confirm whether the source media device responded appropriately because verification may be automatically performed by analyzing content on a video frame obtained from the source media device. As a result, testing of various communication protocols may be carried out with minimal user involvement, enabling subsequent control of devices coupled to the multimedia switch to be carried out in a dynamic fashion.

III. Automatic Control Test of a Media Device

FIG. 1 is a block diagram of a system 100 that is configured to automatically perform a control test to determine whether a multimedia receiver can control an electronic device, in accordance with an embodiment. As shown in FIG. 1, system 100 includes one or more electronic device(s) 102, a multimedia receiver 104, and a control device 128.

In the illustrative example shown in FIG. 1, electronic device(s) 102 may be source media devices configured to provide audio and/or video signals (e.g., multimedia content). Electronic device(s) 102 may also include sink devices configured to receive audio and/or video signals for playback. For instance, electronic device(s) 102 may be a Blu-ray player, a STB, a streaming media player, a TV, and/or a projector. The types of electronic devices are only illustrative, and electronic device(s) 102 may be any electronic device capable of providing and/or playing back AV signals.

As shown in FIG. 1, multimedia receiver 104 includes AV port(s) 110, a switch circuit 106, control logic 112, automatic control testing logic 114, a network interface 116, a storage 118, a device control mapping 120, a receiver 122, an IR transmitter 124, and an RF transmitter 126. As further shown in FIG. 1, electronic device(s) 102 are coupled to AV port(s) 110. In embodiments, electronic device(s) 102 may be coupled to AV port(s) 110 via a High-Definition Multimedia Interface (HDMI) cable 108. Port(s) 110 may be further configured to transmit a control signal 108A to electronic device(s) 102 using an HDMI-CEC communication protocol. Although it is described herein that control signal 108A may be transmitted using an HDMI-CEC communication protocol, it is understood that control signal 108A may include any other suitable transmission using the HDMI cable interface, or any other signaling protocol available with other types of audio/video interfaces. AV port(s) 110 may be automatically configured to be source AV ports or sink AV ports upon connecting electronic device(s) 102 to AV port(s) 110.

Although one or more devices illustrated in FIG. 1 may be coupled via HDMI interface in an illustrative arrangement, other interfaces are also contemplated for transmission of AV content, including but not limited to a video graphics array (VGA) cable, a universal serial bus (USB) cable, digital video interface (DVI) cable, a DisplayPort interface, a component video interface, a composite video interface, and a coaxial video interface.

Although embodiments described herein are illustrated as part of a multimedia receiver (which may include, but is not limited to a home entertainment control system, such as a hub, a multimedia switching device, an AVR, a TV, a projector, etc.), it is understood that implementations described herein are not intended to be limited to the illustrative systems shown. For instance, the illustrative systems of FIG. 1 and/or FIG. 3 (described below) may comprise any combination of components, any number of electronic devices (e.g., media devices), and may be coupled in any suitable manner (e.g., such as AV interfaces other than an HDMI interface, including one or more intermediate devices such as an AVR, etc.). Furthermore, it is understood and appreciated that any other device that may transmit test commands to another electronic device may implement the techniques described. For example, any one or more of AV port(s) 110, switch circuit 106, control logic 112, automatic control testing logic 114, network interface 116, storage 118, device control mapping 120, receiver 122, IR transmitter 124, and RF transmitter 126 may be implemented in a remote control (e.g., a universal remote control), a smartphone, a tablet, a computer, or any other device that can communicate or control another electronic device using one or more communication protocols.

Switch circuit 106 may be configured to connect a particular source AV port (e.g., one of AV port(s) 110) to a particular one or more sink AV ports (e.g., another one of AV port(s) 110) based, for instance, on a user command (e.g., received as voice command 130 or via control device 128). Additional details regarding the auto-configuration of AV port(s) may be found in U.S. patent application Ser. No. 14/945,079, filed on Nov. 18, 2015 and entitled "Auto Detection and Adaptive Configuration of HDMI Ports," the entirety of which is incorporated by reference. Furthermore, additional details regarding the identification of electronic device(s) and the mapping of electronic device(s) to AV port(s) may be found in U.S. patent application Ser. No. 14/945,125, filed on Nov. 18, 2015 and entitled "Automatic Identification and Mapping of Consumer Electronic Devices to Ports on an HDMI Switch," the entirety of which is incorporated by reference.

Receiver 122 comprise a receiver configured to receive one or more command(s) that indicate that a user would like to use one or more of electronic device(s) 102 for providing and/or presenting content. For example, receiver 122 may be configured to receive such command(s) from control device 128 (or any other control devices not shown in FIG. 1) or voice command 130.

In accordance with an embodiment, control device 128 may be operable to transmit a request to control any one or more of electronic device(s) 102 by transmitting a control signal 128A. The control signals may be transmitted via a wired connection (e.g., via a Universal Serial Bus (USB) cable, a coaxial cable, etc.). In accordance with another embodiment, the control signals are transmitted via a wireless connection (e.g., via infrared (IR) communication, radio frequency (RF) communication (e.g., Bluetooth™, as described in the various standards developed and licensed by the Bluetooth™ Special Interest Group, technologies such as ZigBee® that are based on the IEEE 802.15.4 standard for wireless personal area networks, near field communication (NFC), other RF-based or internet protocol (IP)-based communication technologies such as any of the well-known IEEE 802.11 protocols, etc.) and/or the like.

Control device 128 may be a remote-control device, a desktop computer, a mobile device, such as a telephone (e.g., a smart phone and/or mobile phone), a personal data assistance (PDA), a tablet, a laptop, etc. Control device 128 may be a dedicated remote-control device including smart features such as those typically associated with a smart phone (e.g., the capability to access the Internet and/or execute variety of different software applications), but without the capability of communicating via a cellular network.

A user may use control device 128 to select a source device and/or a sink device that the user would like to use for providing and/or presenting content. After making a selection, control device 128 may transmit a command 128A to receiver 122 that includes an identifier of the selected source and/or sink devices. The identifier may include, but is not limited to, the type of the electronic device (e.g., a Blu-ray player, a DVD player, a set-top box, a streaming media player, a TV, a projector etc.), a brand name of the electronic device, a manufacturer of the electronic device, a model number of the electronic device, and/or the like. In an embodiment, control device 128 may also identify a particular command to be carried out on one or more of electronic device(s) 102, such as a command to power on a device, switch an input of a device, adjust a volume of a device, launch an application and/or multimedia content on a device, etc.

Receiver 122 may also be configured to receive one or more voice commands 130 from a user that identify electronic device(s) (e.g., electronic device(s) 102) a user would like to use for providing and/or presenting content. For example, the user may utter one or more commands or phrases that specify electronic device(s) that the user would like to use (e.g., "Watch DVD," "Watch satellite TV using projector," "Turn on streaming media device"). The command(s) may identify electronic device(s) by one or more of the following: a type of the electronic device, a brand name of the electronic device, a manufacturer of the electronic device, a model number of the electronic device and/or the like. In accordance with an embodiment, receiver 122 may comprise a microphone configured to capture audio signals. In such an embodiment, receiver 122 and/or another component of multimedia receiver 104 is configured to analyze audio signals to detect voice commands included therein. It is noted and understood that receiver 122 may comprise any number of signal receivers, such as one or more separate receivers for each communication protocol associated with control device 128, and/or one or more combined receivers configured to receive signals using a plurality of communication protocols.

A microphone may be included in control device 128. In accordance with such an embodiment, control device 128 is configured to analyze the audio signal received by the microphone to detect voice command(s) included therein, identify the electronic device(s) specified by the user, and/or transmit command(s) including identifiers for the identified electronic device(s) to receiver 122. After receiving such command(s), receiver provides the identifier(s) included therein to a mapping component (not shown) in control logic 112. Based on the identifier(s) in the mapping component, control logic 112 may be configured to provide a control signal to switch circuit 106, which causes switch circuit 106 to connect the identified source AV port to the identified and/or determined sink AV port.

Multimedia receiver 104 may be configured to transmit a control signal to any of electronic device(s) 102. The control signal may be any type of signal to control one or more electronic device(s) 102, such as a signal to control a power state, an input, an output, an audio setting, a video setting, a navigation, a menu, a guide, launching of applications or multimedia content, or any other setting of electronic device(s) 102. In embodiments, electronic device(s) 102 may be configured to receive control signals using any one or more communication protocols. For example, as shown in FIG. 1, multimedia receiver 104 may transmit to electronic device(s) 102 an IP control signal 116A via a network interface 116, an IR control signal 124A via an IR transmitter 124, an RF control signal 126A via an RF transmitter 126, and/or a HDMI-CEC control signal 108A via an HDMI interface 108.

Network interface 116 is configured to enable multimedia receiver 104 to communicate with one or more other devices (e.g., electronic device(s) 102) via a network, such as a local area network (LAN), wide area network (WAN), an ethernet, and/or other networks, such as the Internet. In accordance with embodiments, network interface 116 may transmit an IP control signal 116A over the network to control one or more functions of electronic device(s) 102. Network interface 116 may include any suitable type of interface, such as a wired and/or wireless interfaces. In embodiments, network interface 116 may further enable multimedia receiver 104 to engage in two-way communication with one or more remote (e.g., cloud-based) systems (not shown). For instance, a remote system, such as a cloud-based server, may identify one or more communication protocols that may be used for communication with electronic device(s) 102, and/or particular commands suitable for communication with the electronic device(s) using the one or more communication protocols.

IR transmitter 124 may transmit an IR control signal 124A using any suitable IR protocol known and understood to those skilled in the art. For instance, IR transmitter 124 may transmit an IR control signal 124A to be received by a suitable IR receiver of the receiving electronic device. In some examples, IR control signal 124A may be transmitted via one or more repeaters or IR signal blasters (not shown), such as a line-of-sight is not present between receiver 122 and the receiving electronic device (e.g., where a device may behind a physical obstruction, such as in a cabinet or a closet).

RF transmitter 126 may transmit an RF control signal via any suitable type of RF communication (e.g., Bluetooth™, as described in the various standards developed and licensed by the Bluetooth™ Special Interest Group, technologies such as ZigBee® that are based on the IEEE 802.15.4 standard for wireless personal area networks, near field communication (NFC), other RF-based or internet protocol (IP)-based communication technologies such as any of the well-known IEEE 802.11 protocols, etc.), and/or the like.

Control logic 112 may include automatic control testing logic 114 configured to automatically test whether multimedia receiver 104 may communicate successfully with one or more electronic device(s) 102 using one or more communication protocols, including an IR communication protocol, an RF communication protocol, an IP communication protocol, and/or an HDMI-CEC communication protocol. In embodiments, automatic control testing logic 114 may be configured to transmit test commands using a plurality of communication protocols and store an indication of each communication protocol for each device that was successful and/or unsuccessful.

In some further embodiments, automatic control testing logic 114 may be configured to browse for media devices available on a network and automatically determine which of the media devices is coupled to multimedia receiver 104 (e.g., via HDMI cable 108 or any other suitable AV interface). For instance, automatic control testing logic may locate a plurality of media devices available on the network, transmit a test command to each of the devices, and analyze an AV signal received by multimedia receiver 104 to determine which of the media devices on the network received a corresponding test command Based on the determination, multimedia receiver 104 may determine the identity of the device coupled to multimedia receiver 104, and store identifying information (e.g., a network address) that may be used for subsequent communications with the device.

Storage 118 may be one or more of any storage device described herein, such as, but not limited to, those described below with respect to FIG. 8. Storage 118 may include device control mapping 120, which may comprise, for instance, one or more indications regarding whether electronic device(s) may be controlled using one or more communication protocols. Device control mapping 120 may include a data structure (e.g., a table/database, or the like) containing one or more entries or other indications identifying whether multimedia receiver 104 verified that the electronic device successfully received and applied a test command from multimedia receiver 104 using one or more communication protocols. In some further examples, device control mapping 120 may also identify an address (e.g., a network address) of the electronic device through which controls may be carried out.

Therefore, in implementations, device control mapping 120 may indicate that multimedia receiver 104 can control a particular electronic device using certain protocols (e.g., IR and IP-based communications in an illustration). In a further embodiment, device control mapping 120 may also identify, for a particular electronic device, individual command types (e.g., a power command, a standby wake-up command, etc.) that may be successfully transmitted to the electronic device using each communication protocol tested. For example, device control mapping 120 may indicate that certain command types may be transmitted using a particular communication protocol, while other command types may not be transmitted (or not transmitted effectively) using the same communication protocol.

Figure 2:
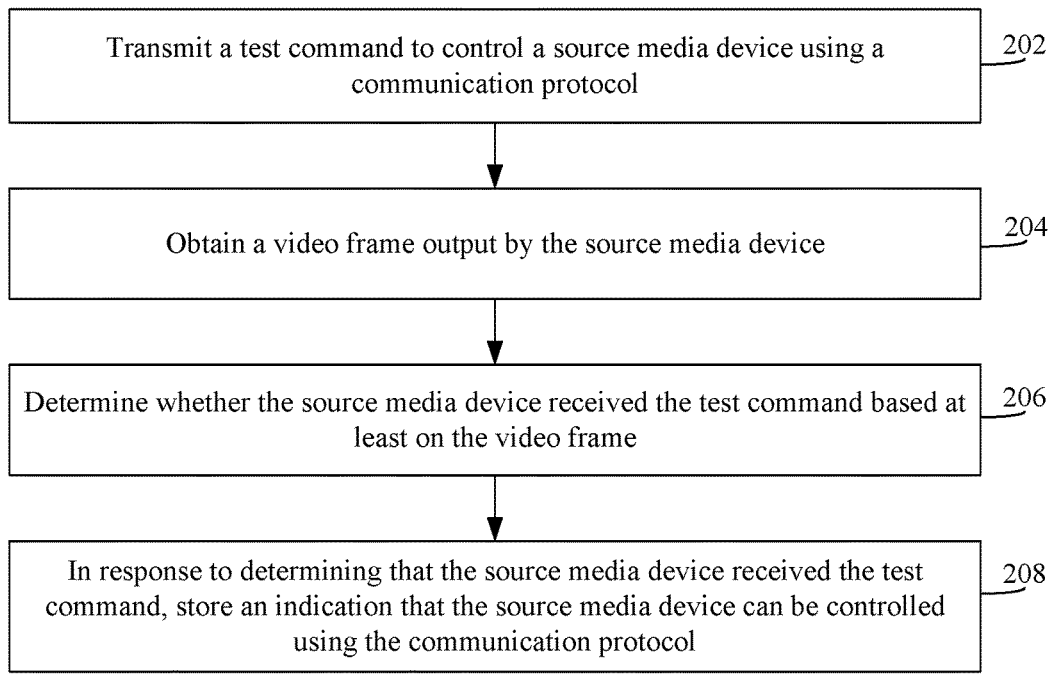
FIG. 2 is a flowchart of a method for determining whether a source media device received a test command, according to an example embodiment.
Figure 3:
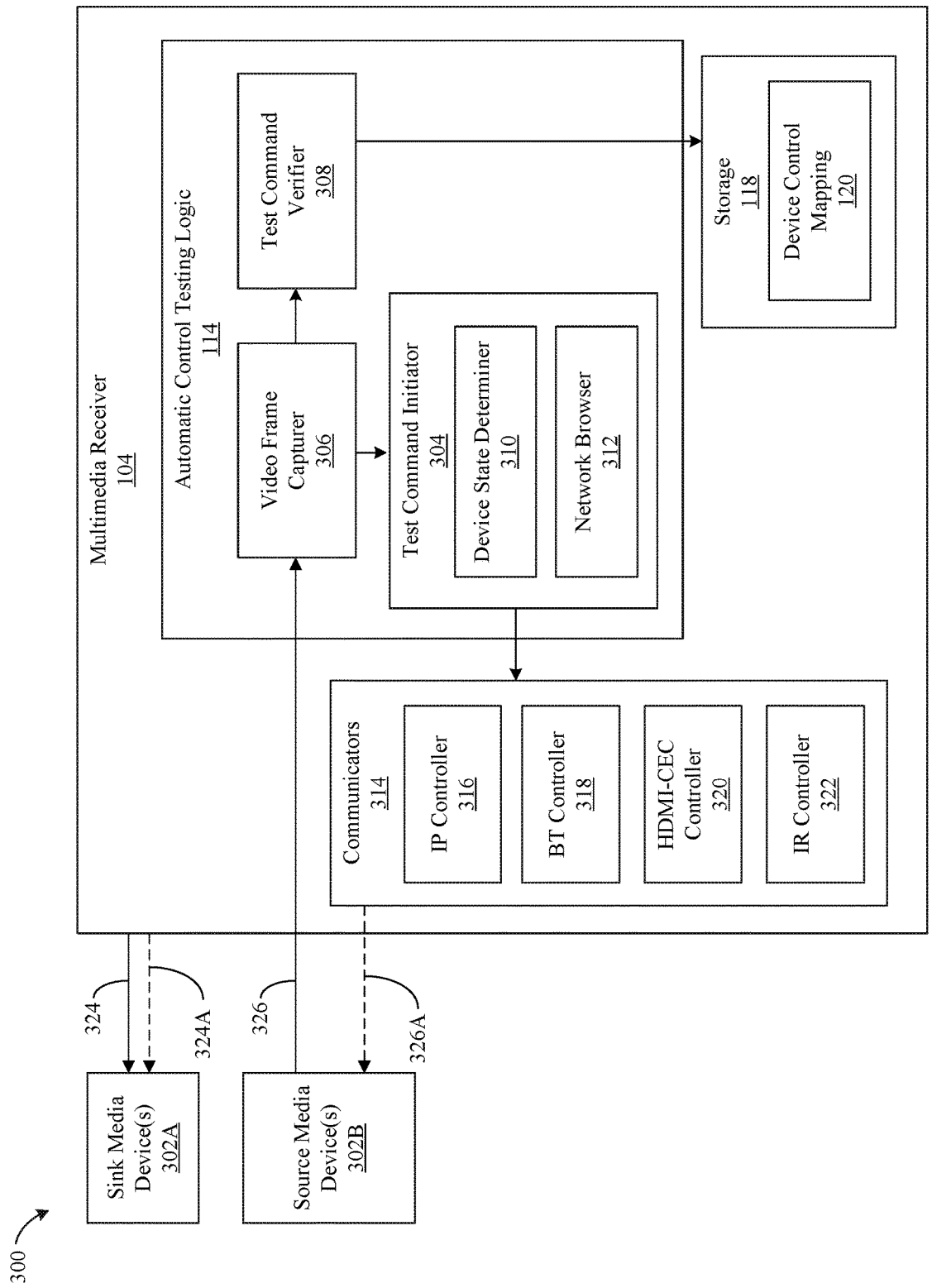
FIG. 3 is a block diagram of a system comprising logic for automatically testing the control of a device, according to an example embodiment.

Accordingly, in implementations, automatically testing communication with a media device may be carried out in various ways. For example, FIG. 2 depicts a flowchart 200 of a method for determining whether a source media device received a test command, according to an example embodiment. In an implementation, the method of flowchart 200 may be implemented by automatic control testing logic 114. For illustrative purposes, flowchart 200 and automatic control testing logic 114 are also described with respect to FIG. 3. FIG. 3 shows a block diagram of a system 300 comprising logic for automatically testing the control of a device, according to an example embodiment. As shown in FIG. 3, system 300 includes one or more sink media device(s) 302A, one or more source media devices 302B, and a multimedia receiver 104. Multimedia receiver 104 of FIG. 3 is an example implementation of multimedia receiver 104 of FIG. 1. Multimedia receiver 104 includes an example implementation of automatic control testing logic 114, storage 118, and communicators 314. Automatic control testing logic 114 includes a test command initiator 304, a video frame capturer 306, and a test command verifier 308. Test command initiator 304 includes a device state determiner and a network browser 312. As shown in FIG. 3, communicators 314 comprises a plurality of controllers, including an IP controller 316, an RF controller 318, an HDMI-CEC controller 320, and an IR controller 322. Other structural and operational embodiments will be apparent to persons skilled in the relevant art(s) based on the discussion regarding flowchart 200 and the system of FIGS. 1 and 3.

As shown in FIG. 2, the method of flowchart 200 begins at step 202. In step 202, a test command to control a source media device is transmitted using a communication protocol. For instance, with respect to FIG. 3, automatic control testing logic 114 may cause a test command to be transmitted to one of source media device(s) 302B using one or more communicators 314. Source media device(s) 302B may include any type of media device configured to provide audio and/or video content, which may be presented on one or more sink media device(s) 302A. In implementations, sink media device(s) 302A and source media device(s) 302B are examples of electronic device(s) 102 described with respect to FIG. 1. Sink media device(s) 302A may be coupled to multimedia receiver 104 via one or more suitable audio/video interfaces 324, and source media device(s) 302B may be coupled to multimedia receiver 104 via one or more audio/video interfaces 326 as described herein, including but not limited to one or more HDMI interfaces as described with respect to element 108 of FIG. 1. Furthermore, multimedia receiver 104 and one or more of sink media device(s) 302A and source media device(s) 302B may communicate with each other using one or more communication protocols 324A and 326A, respectively, as described herein. Such communication protocols include, but are not limited to, an IR communication protocol, RF communication protocol, IP communication protocol, and/or HDMI-CEC communication protocol.

As shown in FIG. 3, test command initiator 304 may be configured to initiate testing of source media device(s) 302B. For instance, test command initiator 304 may transmit a signal to communicators 314 to transmit a test command to control one or more of the source media devices using one or more communication protocols. In examples, test command initiator and/or communicators 314 may cause any one or more of IP controller 316, RF controller 318, HDMI-CEC controller 320, or IR controller 322 to transmit a test command using the corresponding communication protocol. For instance, IP controller 316 may cause a test command to be transmitted to a source media device via network interface 116 (e.g., via an IP network), RF controller 318 may cause a test command to be transmitted to a source media device using RF transmitter 126, HDMI-CEC controller 320 may cause a test command to be transmitted to a source media device via HDMI-CEC signal 108A, and IR controller 322 may cause a test command to be transmitted to a source media device using IR transmitter 124.

In implementations, a test command may be a command determined by automatic control testing logic 114 for testing communication with a source media device. For instance, a test command may be a predetermined type of command for a particular device, or even a plurality of types of commands for a device. In some implementations, a test command may comprise one or more commands that may be used to verify successful control of a device, such that when communication of the test command are successfully applied on a source media device using a particular communication protocol, it may be inferred that the multimedia receiver 104 may communicate the test command and/or one or more additional commands not tested with the source media device using the same communication protocol. For instance, if a particular test command is successfully received by a device using an IR communication protocol, it may be inferred that a clear line of sight exists between the IR transmitter and the source device sufficient for IR transmissions, thereby eliminating the need for further testing of IR commands in some instances.

A test command may include any type of control operation on source media device(s) 302B, including but not limited to navigation commands, content playback commands (e.g., play, pause, fast forward, rewind, stop, etc.), launching applications, games, interfaces, content, menus, guides, etc. In some instances, a test command may comprise a series or sequence of commands (e.g., a plurality of navigation commands), such as a sequence of commands to navigate through a series of GUI screens and selecting a particular object.

For instance, IR controller 322 may cause IR transmitter 124 to transmit any one or more IR-based commands to source media device(s) 302B to test IR communications. IR-based test commands may include navigation commands (e.g., navigate up, down, left, right, selecting an element, navigating to a previous screen, etc.), content playback commands, launching certain screens or interfaces within source media device(s) 302B (e.g., launching a guide on a set-top box, accessing a list of pre-recorded programs, accessing a home screen, etc.) and/or searching for content. In implementations, IR transmitter 124 may be configured to transmit IR commands using an IR code associated with the device to which an IR test command is being transmitted. A mapping of such IR codes to media devices may be stored locally on multimedia receiver 104 and/or accessed from a remotely located storage via network interface 116.

RF controller 318 may cause RF transmitter 126 to transmit a test command using any RF-based communication protocol described herein. In some implementations, RF transmitter 126 may include a transmitter for transmitting a test command via a Bluetooth™ protocol. Examples of Bluetooth™ capable devices include, but are not limited to Amazon FireTV, Nvidia Shield, Sony Playstation 3, Sony Playstation 4, etc. Test commands transmitted by RF transmitter 126 may similarly include navigation commands and/or playback commands as described herein. In some implementations, RF-based commands may comprise commands to navigate to certain screens or interfaces, such as launching a home screen, a search screen, launching a game or application, or moving between various screens, etc.

IP controller 316 may cause a test command to be transmitted via network interface 116, such as a local area network. Commands transmitted using network interface 116 may similarly comprise navigation commands as described herein, as well as one or more other commands to navigate to or launch certain screens, interfaces, applications, content, etc. In some implementations, test commands transmitted via network interface 116 may include one or more text strings (e.g., automatically inputting a search string in a search box). For instance, a test command for a source media device that is potentially controllable via network interface 116 may include searching and/or launching a particular item of multimedia content (e.g., a predetermined movie or television show). Commands transmitted via network interface 116 may be transmitted to source media device(s) 302B based on a network address, such as an IP address or a Media Access Control (MAC) address. As will be described in more detail below with respect to FIG. 6, some implementations enable the automatic identification of a network address for a device coupled to multimedia receiver 104. Examples of devices that may be controllable via an IP-based command include, but are not limited to a Roku streaming media device, AppleTV, Amazon FireTV, Nvidia Shield, certain set-top boxes, etc.

In some examples, a test command transmitted via network interface 116 may comprise an image or a video to be presented or casted on one of sink media device(s) 302A. For instance, test command initiator 304 may be configured to cause IP controller 316 to transmit a known or predetermined image or video to be casted from source media device(s) 302B via network interface 126. For instance, in response to receiving a test command to cast the image or video, source media device(s) 302B may output, to multimedia receiver 104 via the appropriate AV interface, the image or video transmitted by test command initiator 304. Casting of such an image or video may be performed in accordance with one or more protocols or standards set forth by the Digital Living Network Alliance® (DLNA), one or more wireless-based network casting protocols, or any other known or future-developed for casting an image or video between devices.

HDMI-CEC controller 322 may cause a test command to be transmitted to a source media device via HDMI interface 108 (e.g., using an HDMI-CEC protocol). Test commands transmitted using an HDMI-CEC protocol may similarly comprise one or more commands described previously, including but not limited to operations to power on or power off a device, navigation commands, etc. Source media device(s) 302B may be configured receive and apply such HDMI-CEC based commands based on an AV.link protocol standardized by the European Committee for Electrotechnical Standardization (CENELEC). HDMI-CEC commands may be transmitted in a single-wire bidirectional serial bus implemented in HDMI interface 108. It is noted and understood that implementations are not limited to transmitting a test command using an HDMI-CEC protocol as described, but may also include transmitting a test command using any other suitable audio/video signaling interface.

In accordance with some implementations, test command initiator 304 may also identify a brand, make, and/or model of source media device(s) 302B prior to transmitting a test command Test command initiator 304 may perform such an identification in any manner, including via an identification by a user and/or automatically. For example, test command initiator 304 may identify a brand, make, and/or model automatically by parsing information (e.g., Extended Display Identification Data, or EDID) in an AV interface, such as HDMI interface 108, analyzing a video or audio signal from the source media device, or any other manner Based on such an identification, test command initiator 304 may determine a format and/or type of test command to transmit to source media device(s) 302B. For instance, if a test command is to be transmitted via IR transmitter 124, IR signal 124A may utilize an IR code associated with a brand, make, and/or model of source media device. In such an example, test command initiator 304 may be configured to cause IR controller 322 to automatically program IR transmitter 124 to utilize the appropriate IR code associated with source media device(s) 302B. In implementations, test command initiator 304 may obtain such a code from a local and/or a remote repository (e.g., accessed via network interface 116).

Furthermore, test command initiator 304 may determine a type of test command to transmit to source media device(s) 302B based on a device brand, make, and/or model. For instance, certain media devices may not comprise an RF receiver. In other words, test command initiator 304 may be configured to limit attempted communication with a device based on a list of communication protocols that are known to be supported by the device as well as individual types of test commands that may be applied to each particular device (e.g., launching a guide menu may not be available for certain source media devices). In such an example, test command initiator 304 may transmit test commands using one or more other communication protocols through which the media device may potentially receive test commands (e.g., IR, HDMI-CEC, and/or IP). It is noted and understood, however, that prior knowledge regarding a device's brand, make, and/or model is not required in all implementations. For instance, where a device brand, make, and/or model is unknown, test command initiator 304 may still be configured to automatically attempt to transmit test commands using one or more available communication protocols (e.g., HDMI-CEC).

In step 204, a video frame output by the source media device is obtained. For instance, with respect to FIG. 3, video frame capturer 306 may obtain a video frame from one of source media device(s) 302 via a corresponding one of port(s) 110 of multimedia receiver 104. The obtained video frame may include one or more frames of video content output by the source media device in any format. For instance, the video frame may be in a raw or uncompressed form, such as in a red, green, blue (RGB) image format. In another embodiment, the video frame may be in a YUV image format. In other embodiments, the video frame may be in any other suitable format (compressed or uncompressed), or may extract images corresponding to the format of the video signal received via the appropriate interface (e.g., in a native image format). In other embodiments, the video frame may be obtained in more than one image format (e.g., in both RGB and YUV formats). In some implementations, one or more pre-processing algorithms may be performed on the obtained video image, including but not limited to an image conversion algorithm, a resizing operation, a thresholding operation, and/or a cropping operation.

In step 206, a determination is made whether the source media device received the test command based at least on the video frame. For example, with reference to FIG. 3, test command verifier 308 may be configured to determine, based at least on the video frame obtained by video frame capturer 306, whether the source media device to which a test command was transmitted was received (e.g., applied to the source media device to carry out the test command successfully). Test command verifier 308 may determine whether a test command was received by a source media device in various ways. For example, test command verifier 308 may analyze the content of the obtained video frame to determine whether the video frame corresponds to an expected result. In other words, based on the type of test command transmitted to the source media device, test command verifier 308 may analyze the obtained video frame following transmission of the test command to determine whether the source media device reacted consistent with application of the test command (e.g., navigated to a certain page, launched a particular item of content, casted an image, or any other types of test commands described herein). Example techniques for determining whether a source media device received a test command are described in greater detail below with respect to FIG. 5.

In this manner, test command verifier 308 may automatically verify whether a transmitted command has been received and successfully applied on source media device(s) 302B. Additional details regarding automatically analyzing video content output by an electronic device may be found in U.S. patent application Ser. No. 15/819,896, filed on Nov. 21, 2017 and entitled "Automatic Screen Navigation for Media Device Configuration and Control," the entirety of which is incorporated by reference. It is also noted and understood that implementations are not limited to obtaining video frames, but may also encompass obtaining and/or analyzing a still image and/or an audio signal.

In some example embodiments, if test command verifier 308 determines that the test command has not been received and/or successfully applied to the source media device, test command initiator 304 may attempt to retry the communication by transmitting the same test command, transmitting a different test command, altering a characteristic of the transmission (e.g., transmitting a test command using a different IR code), and/or providing an indication or notification to a user. For instance, a user notification may prompt the user via one of sink media devices 302A to verify aspects of the user's system configuration, such as verifying that that a network cable is plugged in to various components of the system, a HDMI cable is appropriately coupling the media device and the multimedia receiver, no physical obstruction is blocking an IR transmitter's line of sight, one or more devices are powered on, etc.

In step 208, in response to determining that the source media device received the test command, an indication that the source media device can be controlled using the communication protocol is stored. For instance, with continued reference to FIG. 3, test command verifier 308 may store an indication in device control mapping 120 that one of source media device(s) 302B was successfully controlled using a particular communication protocol in response to a test command transmitted to the device using the protocol. For example, device control mapping 120 comprise an indication that test command verifier 308 verified the successful transmission and application of a test command to a particular one of source media device(s) 302B using a particular communication protocol. In embodiments, device control mapping 120 may be stored locally on multimedia receiver 104, or may be stored remotely (e.g., on a cloud-based server).

Device control mapping 120 may comprise any suitable structure, including but not limited to a database, table, listing, etc. that may associate a device and one or more tested communication protocols. For instance, device control mapping 120 may identify, for each device tested, the device name, a device identifier (e.g., a model number, serial number, and/or any other identifying information), each communication supported by the device, and an indication whether communication was verified using the communication protocol. In some implementations, device control mapping 120 may also be configured to identify a device address via which communications between multimedia receiver 104 and the device may be carried out, such as an IP address, a MAC address, a logical address (e.g., for communications using the HDMI-CEC protocol), a device key (e.g., a primary key for communications using Bluetooth communications), etc. In some other implementations, device control mapping 120 may also identify a code, such as an IR code, that was successfully tested to communicate with a device.

It is also noted that automatic control testing logic 114 may be configured to perform an automatic control test for one or more source media device(s) 302B for a plurality of different communication protocols. In other words, test command verifier 308 may be configured to verify, for a particular source media device, whether the multimedia receiver 104 was able to successfully transmit a test command to the source media device using various protocols (e.g., IR, IP, RF, and/or HDMI-CEC). In such examples, automatic control testing logic 114 may be configured to perform a first automatic control test for a particular source media device using a first communication protocol, and upon completion of the first test, perform a second automatic control test for the same source media device using a second communication protocol, and so on until each communication protocol has been tested (or it has been determined that certain protocols need not be tested where the source media device does not support communications using such a protocol).

Therefore, in implementations, test command initiator 304 may cause communicators 314 to transmit a plurality of test commands to control the source media device, each test command being transmitted using a different communication protocol. For each of the plurality of test commands transmitted, video frame capturer 306 may obtain a video frame from the source media device following transmission of the test command. Test command verifier 308 may determine, for each test command, whether the source media device responded to the test command, and in response to the determination, store an indication that the source media device can be (and/or cannot be) controlled using the communication protocol corresponding to the test command.

Accordingly, in implementations, a list, mapping, or other categorization may be generated that identifies which communication protocols may be used to successfully transmit commands to control each source media device. For example, even if a particular source media device supports a communication protocol (e.g., IR-based commands), if the device is located behind an obstruction, such as located within a closet, IR signals may not be received. In such a scenario, automatic control testing logic 114 may determine that IR-based commands are not suitable for transmission to the particular device and/or store such an indication in device control mapping 120. During operation of the source media device, multimedia receiver 104 may rely on other communication protocols that may have been successfully verified for the device (e.g., RF and/or IP-based transmissions) and stored in device control mapping 120. In other words, where receiver 122 receives a request to perform an action executable on one of source media device(s) 302B, a particular one of communicators 314 (based at least on device control mapping 120 that identifies, among other things, which communication protocols were verified to work with the source media device) may be selected to transmit an operation command corresponding to the request. In this manner, multimedia receiver 104 not only may be configured to automatically determine which protocols have been confirmed to work for a particular device, multimedia receiver 104 may also be configured to automatically carry out subsequent controls of the device during user operation based on such testing.

In some further implementations, device control mapping 120 may also comprise one or more different command types that may be communicated using each of the communication protocols. As an illustrative example, device control mapping 120 may indicate that a power command was successfully verified with a Roku® streaming media device using an IR or RF communication protocol, but not with another protocol (e.g., an IP-based communication protocol). In this manner, device control mapping 120 may not only identify which communication protocols were verified to work with a particular device, but also individual test commands that were verified to work (or not work).

Accordingly, device control mapping 120 may indicate whether multimedia receiver 104 may communicate with source media device(s) 102B using any one or more of an HDMI-CEC control signal 108A, an IP control signal 116A, an IR control signal 124A, and/or an RF control signal 126A. In this manner, device control mapping 120 may comprise a categorization or association between each source media device and its ability to be successfully controlled by one or more communication protocols. Using such a categorization, multimedia receiver 104 may determine which one (or more) communication protocols to utilize during actual operation of the source media device to ensure a successful control operation and/or enhance a user experience.

For example, implementations described herein may also enable a real-time verification of commands transmitted to a media device during user operation (i.e., not during testing). For instance, if multimedia receiver 104 transmits a command to a set-top box to change a channel but the set-top box failed to respond, multimedia receiver 104 may determine, by analyzing one or more video frames, that the set-top box did not receive or apply the command successfully. In such a scenario, multimedia receiver 104 may be configured to automatically re-transmit the command using the same communication protocol or optionally re-transmit the command using one or more other protocols for which testing has previously been performed in accordance with implementations described herein.

Figure 4:
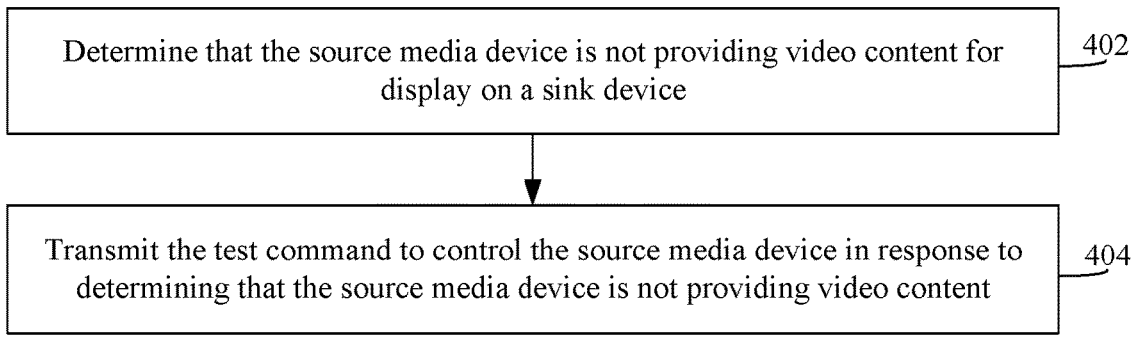
FIG. 4 is a flowchart of a method for transmitting a test command based on a device state, according to an example embodiment.

In some implementations, automatic control testing may be performed automatically and/or without user involvement. For instance, FIG. 4 is a flowchart of a method for transmitting a test command based on a device state, according to an example embodiment. For illustrative purposes, FIG. 4 will be described with continued reference to systems 100 and 300 of FIGS. 1 and 3, respectively. Other structural and operational embodiments will be apparent to persons skilled in the relevant art(s) based on the discussion regarding flowchart 400 and the systems of FIGS. 1 and 3. Flowchart 400 and systems 100 and 300 are described in further detail as follows.

Flowchart 400 begins with step 402. In step 402, it is determined that the source media device is not providing video content for display on a sink device. For instance, with reference to FIG. 3, device state determiner 310 may be configured to determine a state of a source media device. In one example, device state determiner 310 may be configured to determine that a source media device (e.g., one of source media device(s) 302B) is not providing video content for display on a sink device (one of sink media device(s) 302B). Device state determiner 310 may determine a state of a device in various ways.

In one implementation, device state determiner 310 may obtain a video frame from video frame capturer 306 to determine that one of source media device(s) 302B is not presently providing video content for presentation on a sink device. Such a determination may be made, for instance, by analyzing the video frame to determine that the source media device is in a sleep or other non-activity state. In other implementations, such a determination may be made if a certain time has elapsed without the content of video frames captured by video frame capturer 306 changing. In yet other examples, device state determiner 310 may determine that a source media device is not providing content for playback on a sink device by determining that the device is not presently powered on (e.g., video frames are not being received from the device). In this manner, device state determiner 310 may determine that a particular source media device is not being used.

In step 404, the test command to control the source media device is transmitted in response to the determination that the source media device is not providing video content for display on the sink device. For instance, with reference to FIG. 3, test command initiator 304 may cause one of communicators 314 to transmit the test command to one of source media device(s) 302B in response to the determination that the source media device is not providing video content for display on one of sink media device(s) 302A. In implementations, the transmission of a test command may be carried out in a similar manner as described above with respect to step 202 of FIG. 2.

In this manner, testing communication with a source media device using a communication protocol may be performed when the source media device is not in use, is in a sleep or other similar non-activity state, or powered off. As a result, automatic testing of commands may be conducted automatically in the background (i.e., with little to no user involvement) and/or without disruption to the user.

It is noted, however, that the testing techniques described herein need not be performed in the background and/or without user involvement. For instance, in some other implementations, testing communication between multimedia receiver 104 and one or more source media device(s) 302B may be initiated in response to an explicit user action, such as a user interaction with an interface of multimedia receiver 104 to perform one or more automatic control tests as described.

Automatic control testing logic 114 may be configured to transmit test commands to one or more source media device(s) 302B using one or more communication protocols to verify whether the device successfully received the command in other ways. In some examples, test command initiator 304 may be configured to initiate an automatic control test in accordance with implementations described herein during a configuration phase. For instance, test command initiator 304 may cause one of communicators 314 to transmit a test command to control a source media device during a configuration procedure of multimedia receiver 104. Such a configuration procedure may comprise an initial configuration procedure (e.g., at the first boot-up of multimedia receiver 104), a periodic configuration procedure (e.g., each day, week, month, etc., or based on any other periodic maintenance schedule), and/or in response to a user-initiated configuration procedure of multimedia receiver 104.

In some other implementations, test command initiator 304 may also initiate an automatic control test based on other factors, such as a network change (e.g., where an IP address of multimedia receiver 104 and/or a particular source media device changed since the device control mapping 120 was last updated). In another example, test command initiator 304 may initiate an automatic control test automatically in response to a determination that one or more sink media device(s) or source media device(s) was connected and/or disconnected from multimedia receiver 104. In this manner, automatic control testing logic 114 may be configured to perform testing of communications with devices to ensure that device control mapping 120 remains up to date.

It is also noted that in some further implementations, automatic control testing need not be performed in some instances where a configuration of a user's home entertainment has changed. For instance, if an IP address of a source media device changed since the last time device control mapping 120 was updated, instead of performing a control test as described herein to test IP-based controls with the source media device, network browser 312 may be configured to automatically identify the source media device's new IP address corresponding to a MAC address (or other device identifier) that may also be stored in device control mapping 120 device control mapping 120. In some other instances, such as where a source media device's logical address changes during an HDMI-CEC negotiation between the media device and multimedia receiver 104, device control mapping 120 may also be similarly configured to store an updated logical address automatically without further control testing, enabling the mapping to be continuously updated.

Figure 5:
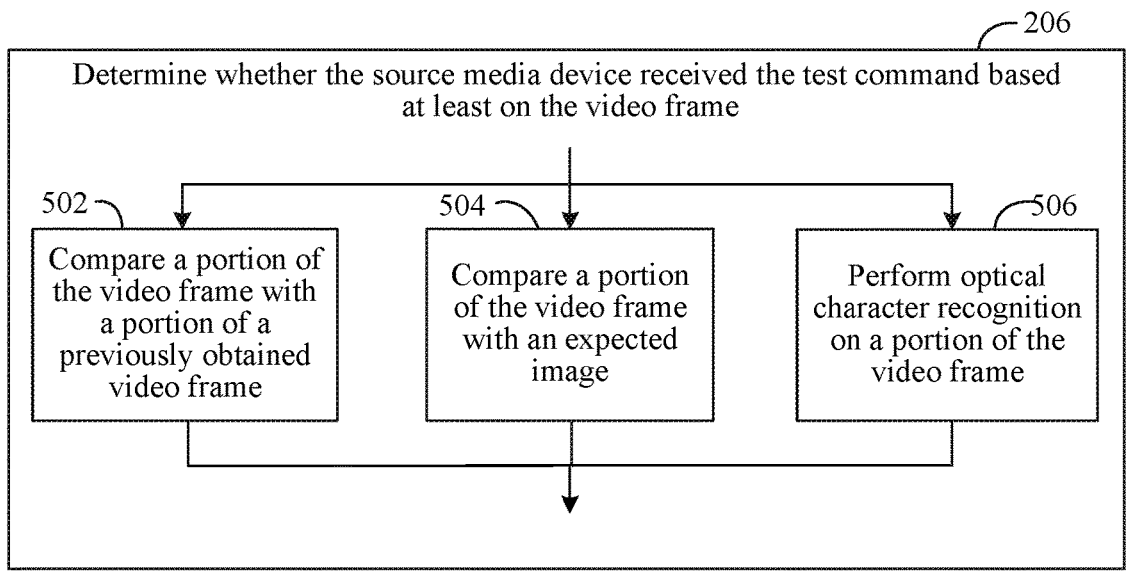
FIG. 5 is a flowchart of a method for determining whether a source media device received a test command based on a video frame, according to an example embodiment.

In accordance with example embodiments, determining whether a source media device received a test command based at least on a video frame may be performed in a variety of ways. For example, FIG. 5 is a flowchart of a method for determining whether a source media device received a test command based on a video frame, according to an example embodiment. For illustrative purposes, FIG. 5 will be described with continued reference to systems 100 and 300 of FIGS. 1 and 3, respectively. Other structural and operational embodiments will be apparent to persons skilled in the relevant art(s) based on the discussion regarding flowchart 500 and the systems of FIGS. 1 and 3. Flowchart 500 and systems 100 and 300 are described in further detail as follows.

In step 502, a portion of the video frame may be compared with a portion of a previously obtained video frame. For instance, with reference to FIG. 3, test command verifier 308 may be configured to compare a video frame obtained by video frame capturer 306, or a portion thereof, with a video frame (or portion of a video frame) previously obtained by video frame capturer 306. Based on the comparison, test command verifier 308 may determine whether a change occurred in the video frame. If no change was observed based on the comparison of the video frames, test command verifier 308 may determine that the test command was not received or successfully applied by the source media device.

If a change was observed based on the comparison, test command verifier 308 may determine whether the change was a result of the test command being applied to the source media device. In one illustrative example, if a test command comprised an operation to navigate to a particular element or screen, test command verifier 308 may analyze the video frame to determine whether such navigation was carried out in the obtained video frame when compared to the previously captured video frame. In some instances, test command verifier 308 may obtain and compare a plurality of video screens to determine whether a test command was carried out (e.g., by comparing the location of a cursor or selected icon on the video frame on successive video frames to determine whether a navigation operation consistent with the transmitted command has taken place).

This is only one illustrative example, as test command verifier 308 may utilize other techniques as well. For instance, in other examples, test command verifier 308 may determine whether a particular screen or interface has been launched on a source media device in response to transmitting the test command to the device. For instance, if the transmitted test command comprised an operation to navigate to a home screen, menu screen, guide screen, launch a particular application or content, or carry out any other GUI function, test command verifier 308 may compare the obtained video frame with a previously captured frame from the same device to determine whether operation was carried out as expected based on the test command.

In step 504, a portion of the video frame may be compared with an expected image. For instance, with reference to FIG. 3, test command verifier 308 may compare a video frame obtained by video frame capturer 306 with an expected image (e.g., a predetermined image, icon, etc.). In one illustrative example, if a particular application or content is launched, test command verifier 308 may compare, using any one or more image analysis techniques known to those skilled in the relevant arts, an image obtained by video frame capturer 306 with an expected image stored in a repository of multimedia receiver 104 or stored in a remotely-accessible repository (e.g., in the cloud) accessible via network interface 116. The expected image may comprise, for instance, a logo or other known representation of a device that may be expected to be present on a video frame upon transmitting a test command (e.g., a test command to launch a guide). In some examples, test command verifier 308 may compare only a portion of a video frame (e.g., an upper left corner where a logo is expected to be present) with an expected image to further conserve processing resources, although implementations are not limited to this example.

For instance, in other examples, test command verifier 308 may compare a larger portion of the video frame obtained by video frame capturer 306 (such as the entire video frame). In one illustrative example, such as where a test command comprised a command to cast an image transmitted to the source media device, test command verifier 308 may analyze the video frame to determine whether the casted image corresponding to the test command is present on the video frame. If test command verifier 308 determines that the obtained image matches the expected image (either completely or based on a similarity threshold), or is otherwise consistent with the expected image, test command verifier 308 may determine that the command was received and applied successfully.

In step 506, optical character recognition (OCR) may be performed on at least a portion of the video frame. For instance, with reference to FIG. 3, test command verifier 308 may be configured to perform one or more OCR techniques on a video frame, or a portion thereof, to determine whether a test command was received by a source media device. In examples, test command verifier 308 may perform one or more OCR operations to determine whether a home, menu, or guide screen is present in a video frame obtained by video frame capturer 306 based on the transmitted test command. In some further examples, test command verifier 308 may perform an OCR operation only for a portion of a video frame where certain GUI elements are expected to be present (e.g., a left-hand side of a screen that may comprise a tree-view of a settings menu, an upper portion of a screen where a device logo that contains text may be present when a guide is launched, etc.). Test command verifier 308 may implement any one or more OCR techniques on a video frame or a portion thereof known and appreciated to those skilled in the relevant arts.

It is noted and understood that test command verifier 308 is not limited to determining whether a source media device received a test command based at least on a video frame using the above techniques. Test command verifier 308 may make such a determination in any other manner, including, but not limited to, any combination of one or more of the above techniques or other techniques not expressly described.

Figure 6:
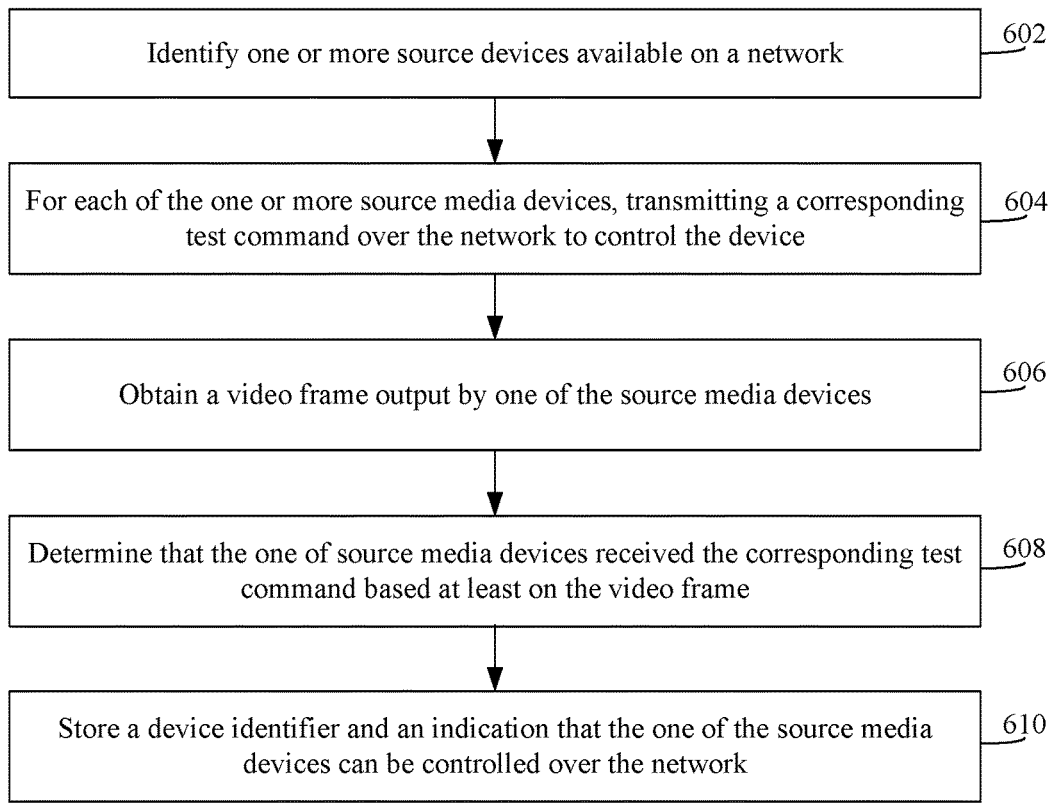
FIG. 6 is a flowchart of a method for transmitting test commands to one or more devices available on a network, according to an example embodiment.

As described earlier, implementations may enable a multimedia receiver to test communications with a device to identify which devices are coupled to the multimedia receiver. In an example, a local area network (e.g., an IP-based network) or a peer-to-peer network (e.g., a Bluetooth™ network) may comprise one or more media devices, only one of which may be coupled to multimedia receiver 104. In such an example, multimedia receiver 104 may implement techniques described herein to identify the particular media device among the plurality of media devices. For instance, FIG. 6 depicts a flowchart 600 of an example method for transmitting test commands to one or more devices available on a network, according to an example embodiment. The method of flowchart 600 will now be described with continued reference to the system of FIGS. 1 and 3, although the method is not limited to those implementations. Other structural and operational embodiments will be apparent to persons skilled in the relevant art(s) based on the discussion regarding flowchart 600 and the system of FIGS. 1 and 3.

Flowchart 600 begins with step 602. In step 602, one or more source media devices available on a network are identified. For instance, with reference to FIG. 3, network browser 312 may be configured to browse a network to which multimedia receiver 104 may be coupled where one or more source media devices are available. In examples, network browser 312 may be configured to browse a local area network and/or a peer-to-peer network to identify such devices. In some instances, network browser 312 may identify an IP address, a MAC address, a device name, a device alias, etc. of each device available on the network.

In the case of a local area network, network browser 312 may utilize one or more network discovery techniques to identify one or more devices available on the network (which may include one or more subnets). For instance, network browser 312 may cause network interface 116 to ping each identified device (e.g., via a brute-force technique) on the network to obtain information regarding the device identity, such as a type of device, an identifier of the device, a brand, etc. In some examples, network browser 312 may be configured to determine whether the identified device is a type that may be potentially controllable via an IP-based command, such as a Roku® streaming media player.

In some other instances, network browser 312 may implement a discovery scheme that is configured to broadcast information in accordance with one or more network protocols, such as Simple Service Discovery Protocol (SSDP), Session Description Protocol (SDP), Domain Name Service (DNS) discovery protocols, and/or DLNA-based protocols to obtain information regarding devices on the network. For instance, in response to one or more of such broadcasts on the network, one or more of the devices available on the network may respond with identifying information or other details regarding the responding device, such as a name, brand, make, model, IP address, MAC address, etc. of the responding device.

Based on the received information for each device coupled to the local area network, network browser 312 may determine which of the devices are media devices that may potentially be controllable via commands transmitted over the network. For example, multimedia receiver 104 may comprise a listing (or obtain such a listing from a remote source) identifying which media devices support IP-based controls and therefore may potentially be controllable via IP commands. Furthermore, multimedia receiver 104 may be configured to automatically identify which devices may be coupled to multimedia receiver (e.g., by identifying a brand, make, model, etc. of the device). In this manner, network browser 312 may be enabled to filter all of the devices identified as being available on the network to determine which subset of devices it should attempt to test for IP-based controls. For instance, if a particular household has multiple Roku® devices available on the home network to which multimedia receiver 104 is also coupled, a filter may be used to identify all such Roku® devices in a from the list of devices available on the network.

In an example involving a peer-to-peer network, such as a Bluetooth™ network, network browser 312 may be configured to automatically identify all of the discoverable devices within a nearby vicinity of multimedia receiver 104 that may potentially match a device coupled to multimedia receiver 104 (e.g., based on an automatically determined device name, brand, etc.) and/or automatically pair with each such device. An example implementation in which automatic pairing may be carried out using techniques explained herein is described in greater detail below with respect to FIG. 7.

In step 604, for each of the one or more source media devices, a corresponding test command is transmitted over the network to control the source media device. For instance, with reference to FIG. 3, test command initiator 304 may cause IP controller 316 (in the case of a local area network) and/or RF controller 318 (in the case of a peer-to-peer network) to transmit a test command to each of the source media devices identified as being available on the network. Test commands may include any of the commands as described herein, including but not limited to navigation commands, commands to launch certain screens, interfaces, or content, or commands to cast an image or video for presentation on a sink media device. Additional examples of such test commands are described above with respect to step 202 of FIG. 2.

In some instances, where a plurality of media devices is located on the network (on a local area network or in a short-range peer-to-peer network), test command initiator 304 may be configured to transmit unique commands to each device identified as being available on the network. In an illustrative example, a network may have four Roku® devices, only one of which is coupled to multimedia receiver 104. A unique test command may be transmitted to each of the four Roku® devices using network interface 116. For instance, test command initiator 304 may cause IP controller 316 to transmit a test command using network interface 116 to a first one of the devices to carry out a first action (e.g., navigate to a first screen such as a guide screen, launch a first application, search for a first item of multimedia content, launch a first item of multimedia content, or any other action that may be carried out through a test command described herein). Test command initiator 304 may transmit a different test command to a second device to carry out a different action (e.g., navigate to a second screen such as a home screen, launch a second application, search for a second item of multimedia content, launch a second item of multimedia content, etc.). Test command initiator 304 may similarly transmit different test commands to the third and fourth devices as well.

In another illustration, the test command transmitted to each source media device(s) 302B available on the network may comprise a command to cast a unique image, video, or audio signal for presentation on one of sink media device(s) 302A. For instance, test command initiator 304 may transmit, to the first source media device, an image with a unique number, letter, barcode, or other representation for casting to a sink device. Test command initiator 304 may transmit a different image (e.g., with a different unique number, letter, barcode, or other unique representation) for casting to a sink device. In this manner, test command initiator 304 may be configured to transmit a test command to each source media device available on a network to cast different content for casting on a sink device.

It is noted and understood that the above examples are illustrative only, and any unique test command may be transmitted to each device available on the network. In addition, any number and combination of test commands may be transmitted to each device identified as being available on the network. Furthermore, in some instances, the test command may also comprise a sequence of commands that are uniquely transmitted to each device, such as navigating a GUI to a search page, inputting a search phrase (e.g., inserting text to search for a particular movie, and launching the movie). In other words, instead of a test command comprising a single operation, test command initiator 304 may transmit a sequence of test commands, such that if the commands are verified as being received successfully, a wider variety of individual commands may be inferred as being operable to control the device using the tested communication protocol.

In step 606, a video frame output by one of the one or more source media devices is obtained. For instance, with reference to FIG. 3, video frame capturer 306 may be configured to obtain a video frame from one of the one or more source media devices coupled to multimedia receiver 104. In other words, while network browser 312 may identify a plurality of a particular type of IP-controllable devices available on a network (e.g., Roku® devices in an earlier illustration), only one of those devices may be physically coupled to multimedia receiver 104, while the reaming devices may be coupled to other systems and/or sink devices. As a result, since only one of the devices may be coupled to multimedia receiver 104, video frame capturer 306 may be configured to receive a video frame from only one of source media device(s) 302B to which one of the unique commands was transmitted.

In implementations, step 606 may otherwise be performed in a similar manner as described above with respect to step 204 of FIG. 2. For instance, multimedia receiver 104 may obtain a video frame from one of port(s) 110 coupled to a particular one of source media device(s) to which a test command was transmitted. In examples, since automatic control testing logic 114 may not know which of the devices identified as being available on the network are coupled to multimedia receiver 104, video frame capturer 306 may be configured to obtain a video frame from a plurality of port(s) 110 to which one of the devices may be coupled.

In step 608, it is determined that one of the one or more source media devices received the corresponding test command based at least on the video frame. In examples, step 608 may be performed in a similar manner as described above with respect to step 206 of FIG. 2 and/or according to flowchart 500 of FIG. 5. For instance, test command verifier 308 may be configured to analyze a video frame to determine whether a video frame obtained by video frame capturer 306 is consistent with a test command transmitted to the device.

It is noted, however, that in some implementation described in FIG. 6, such as where a plurality of unique test commands may be transmitted to a plurality of devices available on a network, test command verifier 308 may analyze the obtained video frame with respect to each of the unique test commands to determine if the video frame corresponds to any of the unique commands. For instance, the test command for a first device comprised a command to launch a guide screen, the test command for a second device comprised a command to launch a particular movie, and the test command for a third device comprised a command to launch a menu screen. In such an illustrative example, if the video frame obtained from the source media device coupled to multimedia receiver 104 indicated that the particular movie was launched, test command verifier 308 may thereby determine that the coupled source media device corresponds to the device to which a test command to launch the movie was transmitted.

In some implementations, an identifier of the media device coupled to multimedia receiver 104 may also be determined. For instance, as discussed above, test command verifier 308 may analyze the one or more obtained video frames to determine whether any of the video frames corresponds to one of the test commands (e.g., navigating to a particular screen or interface, launching a particular application, casting a certain image, etc.). Based on such a determination that an obtained video frame corresponds to a particular test command, an identifier of the device coupled to multimedia receiver 104 may be determined. For instance, because test commands may be transmitted to each of the devices using a network address discovered when browsing a network, determining that a test command was successfully received by a particular device may thereby indicate the network address of the device that successfully received the test command (i.e., the source media device coupled to multimedia receiver 104). In implementations, the identifier of the media device may comprise a network identifier, such as an IP address, a MAC address, a device name, a device alias, etc. of the device.

In this manner, not only may test command verifier 308 be configured to identify which device, from among a plurality of devices available on a network, is coupled to multimedia receiver 104, test command verifier 308 may also be configured to determine that the coupled media device successfully received an IP-based test command (or a sequence of IP-based commands). In some implementations, once an identifier (such as an IP address) is determined, automatic control testing logic 114 may be configured to further transmit additional test commands to the source media device (using the identified IP address) to verify control of the device using the network (e.g., by testing a plurality of different command types.

In step 610, in response to determining that the one of the one or more source media devices received the test command, a device identifier and an indication that the one of the one or more source media devices can be controlled over the network is stored. For instance, with reference to FIG. 3, test command verifier 308 may store, in device control mapping 120, the identifier (e.g., network address(es) or the like) of the media device as well as an indication that the media device may be controlled over the network. In implementations, the stored identifier (e.g., network address(es) may be used by multimedia receiver 104 for a variety of purposes, such as for further control testing of the media device (e.g., transmitting additional test commands to the device using the IP address identified as belong to the device coupled to the multimedia receiver), and/or to appropriately transmit commands to control the media device during operation (e.g., based on a user-input to control the device to carry out certain actions. It is noted that device control mapping 120 may also store, for the media device, an indication that the device may be controlled using any other communication protocol (e.g., RF, IR, HDMI-CEC, etc.) as described herein.

It is also noted that in some other implementations, a network address may be automatically discovered in other ways. For instance, where other communication protocols have been tested to work with a particular one of source media device(s) 302B, test command initiator 304 may be configured to transmit a series of commands for application on the source media device using any of the tested communication protocols (e.g., IR, RF, and/or HDMI-CEC) to navigate the media device to a settings or status menu option in which the network address of the source media device may be obtained by automatic control testing logic 114 (e.g., by performing an OCR operation on a video frame containing the network address).

As a result, instead of prompting a user to identify a network address of a coupled device, which can be cumbersome and difficult to locate and input in some scenarios, automatic control testing logic 114 may automatically determine the network address of a coupled device, while also testing communication with the device using the network address with little to no user involvement.

Figure 7:
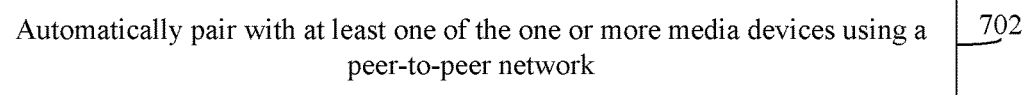
FIG. 7 is a flowchart of a method for automatically pairing with a media device, according to an example embodiment.

As described earlier, implementations may enable a multimedia receiver to test communications a device over a peer-to-peer network. For instance, FIG. 7 depicts a flowchart 600 of an example method for automatically pairing with a media device, according to an example embodiment. The method of flowchart 700 will now be described with continued reference to the system of FIGS. 1 and 3, although the method is not limited to those implementations. Other structural and operational embodiments will be apparent to persons skilled in the relevant art(s) based on the discussion regarding flowchart 700 and the system of FIGS. 1 and 3.

Flowchart 700 begins with step 702. In step 702, an automatic pairing may be carried out with at least one of the one or more media devices using the peer-to-peer wireless network. For instance, with reference to FIG. 3, RF controller 318 may cause RF transmitter 126 to automatically connect or pair to one or more of source media device(s) 302B, or may connect or pair to such devices manually (e.g., via a user interaction). For example, network browser 312 may be configured to automatically identify Bluetooth™ discoverable devices in the vicinity of multimedia receiver 104 and cause RF controller 318 to pair to one or more source media device(s) 302B where a pairing pin is not required (e.g., in an open-pairing configuration), or may be configured to automatically attempt to pair with the device using one or more commonly used pairing pins (e.g., 0000 or 1234). In examples, such a pain may be transmitted via one or more communication protocols described, including via RF controller 318 (e.g., via a Bluetooth™ communication protocol).

In other instances, such as where a non-standard pin is required for pairing, test command initiator 304 may be configured to automatically transmit one or more commands to the source media device for which pairing is being attempted to navigate the device using another communication protocol (e.g., IR, HDMI-CEC, and/or IP). For instance, test command initiator 304 may navigate the source media device in a certain manner to launch a home or menu screen, launch a settings option, navigate to a Bluetooth™ settings page, make the source media "discoverable" for pairing, etc. Such navigation may be performed automatically based on analyzing the screen content of the source media device, and/or based on prior knowledge of a particular device's GUI arrangement. In some implementation, such as where the pin is presented by one of source media device(s) 302B, RF controller 318 may be configured to utilize the displayed pin based on an obtained video frame (e.g., via OCR or other suitable technique) to complete the pairing process. In other examples, such as where multimedia receiver 104 generates the pin required for pairing, RF controller 318 may be configured to cause the generated pin to be input into the appropriate GUI element of the source media device upon navigation using one or more of the communication protocols described herein.

It is noted that once automatic pairing is performed, automatic control testing logic 114 may be configured to transmit one or more test commands (e.g., navigation commands, launching of content, inputting text, etc.) to the source media device via RF controller 318 to verify that the source media device is controllable via the peer-to-peer network. As a result, automatic control testing logic 114 may be configured to automatically pair with a Bluetooth™ capable device and optionally perform additional communication testing with little to no user involvement.

IV. Further Example Embodiments and Advantages

One or more embodiments described herein may perform their functions according to the flowcharts described herein. Additional structural and operational embodiments will be apparent to persons skilled in the relevant art(s) based on the discussions regarding the flowcharts and embodiments herein. In some example embodiments, one or more of the steps of the described flowcharts may not be performed. Moreover, steps in addition to or in lieu of the steps of the described flowcharts may be performed (some of which were described above). Further, in some example embodiments, one or more of the steps of the described flowcharts may be performed out of the order shown or described, in an alternate sequence, and/or partially (or completely) concurrently with other steps.

The automatic control testing embodiments and/or any further systems, sub-systems, devices and/or components disclosed herein may be implemented in hardware (e.g., hardware logic/electrical circuitry), or any combination of hardware with software (computer program code configured to be executed in one or more processors or processing devices) and/or firmware.

Figure 8:
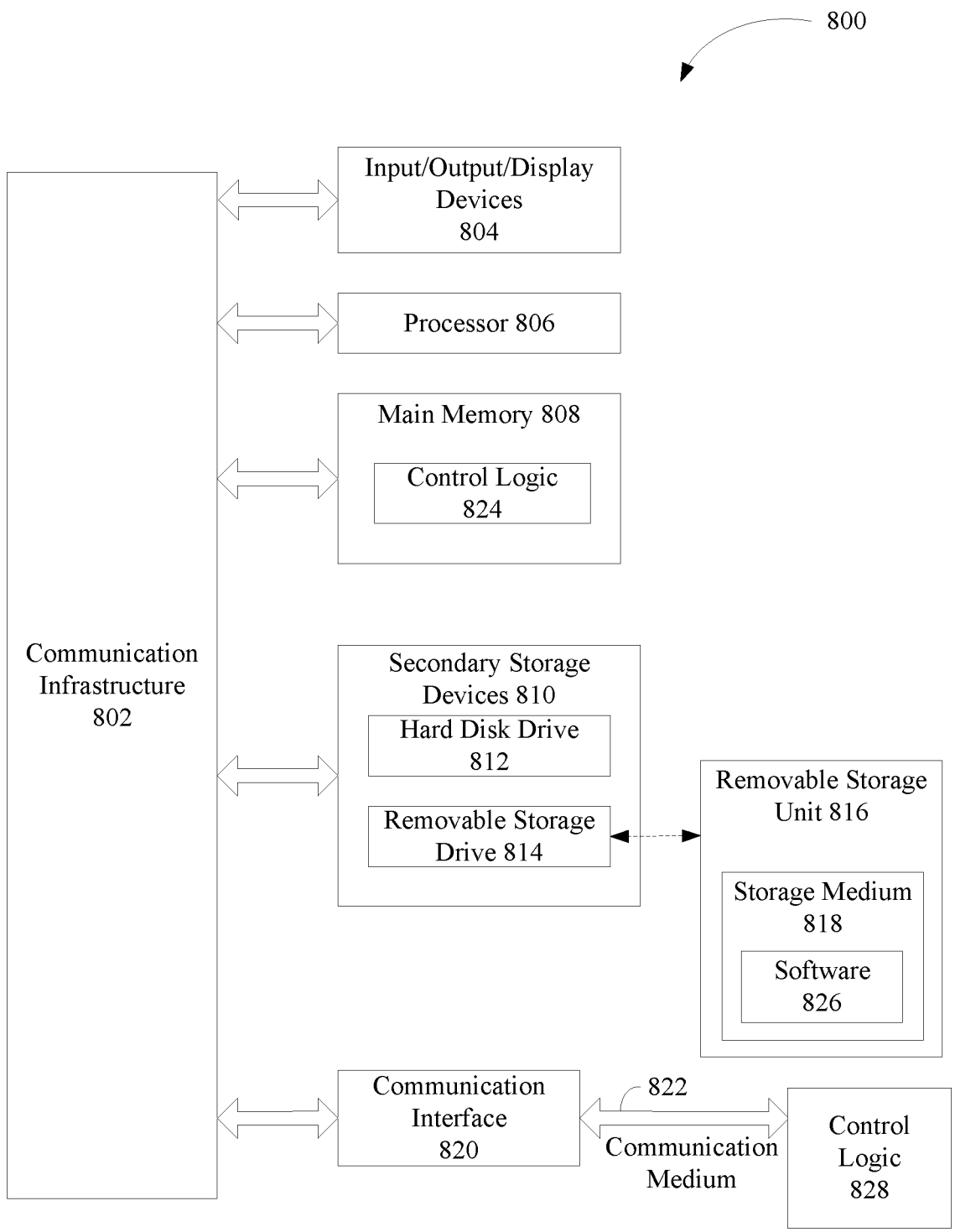
FIG. 8 is a block diagram of an example computer system in which embodiments may be implemented.

The embodiments described herein, including systems, methods/processes, devices, and/or apparatuses, may be implemented using well known processing devices, telephones (smart phones and/or mobile phones), tablet computers, servers, and/or, computers, such as a computer 800 shown in FIG. 8. It should be noted that computer 800 may represent communication devices, processing devices, servers, and/or traditional computers in one or more embodiments. For example, the automatic control testing embodiments, and any of the sub-systems or components respectively contained therein, may be implemented using one or more computers 800 or portions thereof. For example, the source media device(s), the sink media device (s), and/or the multimedia receiver, of FIGS. 1 and 3, and/or the components included therein, and each of the steps of flowchart 200, 400, 500, 600, and 700 can each be implemented using one or more computers 800.

Computer 800 can be any commercially available and well-known communication device, processing device, and/or computer capable of performing the functions described herein, such as devices/computers available from International Business Machines®, Apple®, Sun®, HP®, Dell®, Cray®, Samsung®, Nokia®, etc. Computer 800 may be any type of computer, including a desktop computer, a server, etc.

Computer 800 includes one or more processors (also called central processing units, or CPUs), such as a processor 806. Processor 806 may include the source media device(s), the sink media device(s), and/or the multimedia receiver, of FIGS. 1 and 3, and/or the components included therein, for example, though the scope of the embodiments is not limited in this respect. Processor 806 is connected to a communication infrastructure 802, such as a communication bus. In some embodiments, processor 806 can simultaneously operate multiple computing threads.

Computer 800 also includes a primary or main memory 808, such as random-access memory (RAM). Main memory 808 has stored therein control logic 824 (computer software), and data.

Computer 800 also includes one or more secondary storage devices 810. Secondary storage devices 810 include, for example, a hard disk drive 812 and/or a removable storage device or drive 814, as well as other types of storage devices, such as memory cards and memory sticks. For instance, computer 800 may include an industry standard interface, such a universal serial bus (USB) interface for interfacing with devices such as a memory stick. Removable storage drive 814 represents a floppy disk drive, a magnetic tape drive, a compact disk drive, an optical storage device, tape backup, etc.

Removable storage drive 814 interacts with a removable storage unit 816. Removable storage unit 816 includes a computer useable or readable storage medium 818 having stored therein computer software 826 (control logic) and/or data. Removable storage unit 816 represents a floppy disk, magnetic tape, compact disk, DVD, optical storage disk, or any other computer data storage device. Removable storage drive 814 reads from and/or writes to removable storage unit 816 in a well-known manner.

Removable storage drive 814 interacts with a removable storage unit 816. Removable storage unit 816 includes a computer useable or readable storage medium 818 having stored therein computer software 826 (control logic) and/or data. Removable storage unit 816 represents a floppy disk, magnetic tape, compact disc (CD), digital versatile disc (DVD), Blu-ray™ disc, optical storage disk, memory stick, memory card, or any other computer data storage device. Removable storage drive 814 reads from and/or writes to removable storage unit 816 in a well-known manner.

Computer 800 also includes input/output/display devices 804, such as touchscreens, LED and LCD displays, monitors, keyboards, pointing devices, etc.

Computer 800 further includes a communication or network interface 818. Communication interface 820 enables computer 800 to communicate with remote devices. For example, communication interface 820 allows computer 800 to communicate over communication networks or mediums 822 (representing a form of a computer useable or readable medium), such as local area networks (LANs), wide area networks (WANs), the Internet, etc. Network interface 820 may interface with remote sites or networks via wired or wireless connections. Examples of communication interface 822 include but are not limited to a modem, a network interface card (e.g., an Ethernet card), a communication port, a Personal Computer Memory Card International Association (PCMCIA) card, etc.

Control logic 828 may be transmitted to and from computer 800 via the communication medium 822.

Any apparatus or manufacture comprising a computer useable or readable medium having control logic (software) stored therein is referred to herein as a computer program product or program storage device. This includes, but is not limited to, computer 800, main memory 808, secondary storage devices 810, and removable storage unit 816. Such computer program products, having control logic stored therein that, when executed by one or more data processing devices, cause such data processing devices to operate as described herein, represent example embodiments described herein.

Techniques, including methods, and embodiments described herein may be implemented by hardware (digital and/or analog) or a combination of hardware with one or both of software and/or firmware. Techniques described herein may be implemented by one or more components. Embodiments may comprise computer program products comprising logic (e.g., in the form of program code or software as well as firmware) stored on any computer useable medium, which may be integrated in or separate from other components. Such program code, when executed by one or more processor circuits, causes a device to operate as described herein. Devices in which embodiments may be implemented may include storage, such as storage drives, memory devices, and further types of physical hardware computer-readable storage media. Examples of such computer-readable storage media include, a hard disk, a removable magnetic disk, a removable optical disk, flash memory cards, digital video disks, random access memories (RAMs), read only memories (ROM), and other types of physical hardware storage media. In greater detail, examples of such computer-readable storage media include, but are not limited to, a hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, flash memory cards, digital video discs, RAM devices, ROM devices, and further types of physical hardware storage media. Such computer-readable storage media may, for example, store computer program logic, e.g., program modules, comprising computer executable instructions that, when executed by one or more processor circuits, provide and/or maintain one or more aspects of functionality described herein with reference to the figures, as well as any and all components, capabilities, and functions therein and/or further embodiments described herein. Embodiments described herein are directed to computer program products comprising such logic (e.g., in the form of program code, instructions, or software) stored on any computer useable medium. Such program code, when executed in one or more processors, causes a device to operate as described herein.

Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, IR, and other wireless media, as well as wired media and signals transmitted over wired media. Embodiments are also directed to such communication media.

The techniques and embodiments described herein may be implemented as, or in, various types of devices. For instance, embodiments may be included, without limitation, in processing devices (e.g., illustrated in FIG. 8) such as computers and servers, as well as communication systems such as switches, routers, gateways, and/or the like, communication devices such as smart phones, home electronics, gaming consoles, entertainment devices/systems, etc. A device, as defined herein, is a machine or manufacture as defined by 35 U.S.C. § 101. That is, as used herein, the term "device" refers to a machine or other tangible, manufactured object and excludes software and signals. Devices may include digital circuits, analog circuits, or a combination thereof. Devices may include one or more processor circuits (e.g., central processing units (CPUs), processor 806 of FIG. 8), microprocessors, digital signal processors (DSPs), and further types of physical hardware processor circuits) and/or may be implemented with any semiconductor technology in a semiconductor material, including one or more of a Bipolar Junction Transistor (BJT), a heterojunction bipolar transistor (HBT), a metal oxide field effect transistor (MOSFET) device, a metal semiconductor field effect transistor (MESFET) or other transconductor or transistor technology device. Such devices may use the same or alternative configurations other than the configuration illustrated in embodiments presented herein.

It is noted that while FIG. 8 shows a server/computer, persons skilled in the relevant art(s) would understand that embodiments/features described herein could also be implemented using other well-known processor-based computing devices, including but not limited to, smart phones, tablet computers, netbooks, gaming consoles, personal media players, and the like.

V. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A system for testing communication with a device, the system comprising:
 a multimedia receiver communicatively coupled to a source media device, the multimedia receiver comprising:
  a communicator configured to transmit a test command to control the source media device using a communication protocol;
  a video frame capturer configured to obtain a video frame output by the source media device; and
  a test command verifier configured to:
   determine whether the source media device received the test command based at least on the video frame by one or more of:
    comparing at least a portion of the video frame with at least a portion of a previously obtained video frame;
    comparing at least a portion of the video frame with an expected image; or
    performing optical character recognition (OCR) on at least a portion of the video frame; and
   in response to a determination that the source media device received the test command, store an indication that the source media device can be controlled using the communication protocol.

2. The system of claim 1, wherein the multimedia receiver further comprises a receiver configured to receive a request to perform an action executable on the source media device; and
 wherein the communicator is configured to transmit an operation command corresponding to the request using the communication protocol based at least on the stored indication.

3. The system of claim 1, wherein the communicator is configured to transmit the test command to control the source media device during a configuration procedure of the multimedia receiver.

4. The system of claim 1, wherein the multimedia receiver further comprises:
 a device state determiner configured to determine that the source media device is not providing video content for display on a sink device; and
 wherein the communicator is configured to transmit the test command to control the source media device in response to the determination that the source media device is not providing video content for display on the sink device.

5. The system of claim 1, wherein the communication protocol includes at least one of:
 an infrared (IR) protocol;

a radio-frequency (RF) protocol;
an Internet Protocol (IP); or
a High-Definition Multimedia Interface (HDMI-CEC) protocol.

6. The system of claim 1, wherein the communicator is configured to transmit a plurality of test commands to control the source media device, each test command being transmitted using a different communication protocol; and
wherein the test command verifier is configured to, for each of the plurality of test commands:
determine whether the source media device received the test command; and
in response to a determination that the source media device received the test command, store an indication that the source media device can be controlled using the communication protocol corresponding to the test command.

7. The system of claim 1, wherein the communicator is configured to transmit the test command to control the source media device in response to a determination that the source media device was coupled to the multimedia receiver.

8. A method of testing communication with a device, the method comprising:
transmitting a test command to control a source media device using a communication protocol;
obtaining a video frame output by the source media device;
determining whether the source media device received the test command based at least on the video frame, the determining comprising one or more of:
comparing at least a portion of the video frame with at least a portion of a previously obtained video frame;
comparing at least a portion of the video frame with an expected image; or
performing optical character recognition (OCR) on at least a portion of the video frame; and
in response to determining that the source media device received the test command, storing an indication that the source media device can be controlled using the communication protocol.

9. The method of claim 8, further comprising:
receiving a request to perform an action executable on the source media device; and
transmitting an operation command corresponding to the request using the communication protocol based at least on the stored indication.

10. The method of claim 8, wherein the transmitting the test command to the source media device is performed by a multimedia receiver during a configuration procedure of the multimedia receiver.

11. The method of claim 8, further comprising:
determining that the source media device is not providing video content for display on a sink device; and
wherein the transmitting the test command to control the source media device is performed in response to determining that the source media device is not providing video content for display on the sink device.

12. The method of claim 8, wherein the communication protocol includes at least one of:
an infrared (IR) protocol;
a radio-frequency (RF) protocol;
an Internet Protocol (IP); or
a High-Definition Multimedia Interface (HDMI-CEC) protocol.

13. The method of claim 8, further comprising:
transmitting a plurality of test commands to control the source media device, each test command being transmitted using a different communication protocol;
for each of the plurality of test commands:
determining whether the source media device received the test command; and
in response to determining that the source media device received the test command, storing an indication that the source media device can be controlled using the communication protocol corresponding to the test command.

14. The method of claim 8, wherein the transmitting the test command to the source media device is performed in response to a determination that the source media device was coupled to a multimedia receiver.

15. A method of testing communication with a device, the method comprising:
identifying one or more source media devices available on a network;
for each of the one or more source media devices, transmitting a corresponding test command over the network to control the source media device;
obtaining a video frame output by one of the one or more source media devices;
determining that the one of the one or more source media devices received the corresponding test command based at least on the video frame, the determining comprising one or more of:
comparing at least a portion of the video frame with at least a portion of a previously obtained video frame;
comparing at least a portion of the video frame with an expected image; or
performing optical character recognition (OCR) on at least a portion of the video frame; and
in response to determining that the one of the one or more source media devices received the test command, storing a device identifier and an indication that the one of the one or more source media devices can be controlled over the network.

16. The method of claim 15, wherein the device identifier comprises a network address.

17. The method of claim 15, wherein the network comprises a peer-to-peer wireless network.

18. The method of claim 17, further comprising:
automatically pairing with at least one of the one or more source media devices using the peer-to-peer wireless network.

19. The method of claim 15, wherein the test command corresponding to the one of the one or more source media devices comprises a command to cast an image to a sink device.

20. The method of claim 15, wherein the one or more source media devices comprises a plurality of source media devices; and
wherein the transmitting the corresponding test command comprises transmitting a different test command to each of the plurality of source media devices over the network.

* * * * *